United States Patent
Lo et al.

(10) Patent No.: US 9,104,413 B2
(45) Date of Patent: Aug. 11, 2015

(54) SYSTEM AND METHOD FOR DYNAMIC MEMORY POWER MANAGEMENT

(71) Applicant: QUALCOMM Incorporated, San Diego, CA (US)

(72) Inventors: Haw-Jing Lo, San Diego, CA (US); Ali Taha, San Diego, CA (US); Dexter T. Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 13/668,865

(22) Filed: Nov. 5, 2012

(65) Prior Publication Data

US 2014/0129757 A1    May 8, 2014

(51) Int. Cl.
*G06F 1/32* (2006.01)
*G06F 12/02* (2006.01)

(52) U.S. Cl.
CPC ............ *G06F 1/3225* (2013.01); *G06F 1/3275* (2013.01); *G06F 12/023* (2013.01); *Y02B 60/1228* (2013.01); *Y02B 60/32* (2013.01)

(58) Field of Classification Search
CPC .... G06F 1/3225; G06F 1/3275; G06F 12/023
See application file for complete search history.

(56) References Cited

U.S. PATENT DOCUMENTS

| | | | |
|---|---|---|---|
| 5,918,249 A * | 6/1999 | Cox et al. | 711/203 |
| 7,269,708 B2 | 9/2007 | Ware | |
| 7,571,295 B2 | 8/2009 | Sakarda et al. | |
| 7,590,815 B1 | 9/2009 | de Waal | |
| 8,095,725 B2 | 1/2012 | Kardach et al. | |
| 2004/0148481 A1 | 7/2004 | Gupta | |
| 2008/0034234 A1 | 2/2008 | Shimizu et al. | |
| 2009/0077307 A1 | 3/2009 | Kaburlasos et al. | |
| 2009/0172319 A1 * | 7/2009 | Gokhale et al. | 711/159 |
| 2011/0283071 A1 | 11/2011 | Yokoya et al. | |
| 2011/0296095 A1 | 12/2011 | Su et al. | |

OTHER PUBLICATIONS

International Search Report and Written Opinion—PCT/US2013/051231—ISA/EPO—Mar. 6, 2014.
Taiwan Search Report—TW102127995—TIPO—Apr. 14, 2015.

* cited by examiner

*Primary Examiner* — Aracelis Ruiz
(74) *Attorney, Agent, or Firm* — Nicholas A. Cole

(57) ABSTRACT

Various embodiments of methods and systems for hardware ("HW") based dynamic memory management in a portable computing device ("PCD") are disclosed. One exemplary method includes generating a lookup table ("LUT") to track each memory page located across multiple portions of a volatile memory. The records in the LUT are updated to keep track of data locations. When the PCD enters a sleep state to conserve energy, the LUT may be queried to determine which specific memory pages in a first portion of volatile memory (e.g., an upper bank) contain data content and which pages in a second portion of volatile memory (e.g., a lower bank) are available for receipt of content. Based on the query, the location of the data in the memory pages of the upper bank is known and can be quickly migrated to memory pages in the lower bank which are identified for receipt of the data.

27 Claims, 10 Drawing Sheets

BEFORE HW-based page migration

| Page Location "U" = upper "L" = lower | Content Stored "0" = yes "1" = no | Eligible for Overwrite |
|---|---|---|
| U-1 | 0 | n/a |
| U-2 | 0 | n/a |
| U-3 | 1 | n/a |
| U-4 | 1 | n/a |
| ⋮ | | |
| U-n | 1 | n/a |
| L-1 | 0 | No |
| L-2 | 0 | Yes |
| L-3 | 1 | n/a |
| L-4 | 1 | n/a |
| ⋮ | | |
| L-n | 1 | n/a |

AFTER HW-based page migration

| Page Location "U" = upper "L" = lower | Content Stored "0" = yes "1" = no | Eligible for Overwrite |
|---|---|---|
| U-1 | 1 | n/a |
| U-2 | 1 | n/a |
| U-3 | 1 | n/a |
| U-4 | 1 | n/a |
| ⋮ | | |
| U-n | 1 | n/a |
| L-1 | 0 | No |
| L-2 | 0 | Yes |
| L-3 | 0 | No |
| L-4 | 0 | No |
| ⋮ | | |
| L-n | 1 | n/a |

BEFORE HW-based page migration

| Page Location<br>"U" = upper<br>"L" = lower | Content Stored<br>"0" = yes<br>"1" = no | Eligible for Overwrite |
|---|---|---|
| U-1 | 0 | n/a |
| U-2 | 0 | n/a |
| U-3 | 1 | n/a |
| U-4 | 1 | n/a |
| . . . | | |
| U-n | 1 | n/a |
| L-1 | 0 | No |
| L-2 | 0 | Yes |
| L-3 | 1 | n/a |
| L-4 | 0 | n/a |
| . . . | | |
| L-n | 0 | n/a |

AFTER HW-based page migration

| Page Location<br>"U" = upper<br>"L" = lower | Content Stored<br>"0" = yes<br>"1" = no | Eligible for Overwrite |
|---|---|---|
| U-1 | 1 | n/a |
| U-2 | 1 | n/a |
| U-3 | 1 | n/a |
| U-4 | 1 | n/a |
| . . . | | |
| U-n | 1 | n/a |
| L-1 | 0 | No |
| L-2 | 0 | No |
| L-3 | 0 | No |
| L-4 | 0 | No |
| . . . | | |
| L-n | 0 | No |

SYSTEM AND METHOD FOR DYNAMIC MEMORY POWER MANAGEMENT

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. Because PCDs rely on a limited capacity power supply, such as a battery, conservation of the power supply is closely related to the overall quality of service ("QoS") experienced by a user. That is, efficient use of the power resources in a PCD can reduce the frequency at which the user must recharge the battery.

Most users don't use their PCD constantly and so it is common for a PCD to remain in an idle, sleep or standby mode for extended periods of time. Importantly, during these sleep periods, even though in an "idle" mode, the PCD is still consuming power in the form of a sleep current. The sleep current of a PCD is the sum of the leakage rates associated with various components within the PCD, including the current required to periodically self refresh volatile memory components such as dynamic random access memory ("DRAM"). The self refresh operation, which overrides the power saving sleep mode of the PCD, is automatically executed at certain intervals and is necessary to maintain data integrity while the PCD is idle.

Self refresh operations of volatile memory components represent a significant portion of a PCD's sleep current and, as such, are at fault for a significant amount of the power drain that a PCD may experience while in an idle state. In fact, as the memory in PCDs continues to increase in size, so does the current required to self refresh it, thereby further increasing the burden on a limited power supply. Consequently, systems or methods are needed in the art for mitigating the amount of current required to maintain data integrity in volatile memory components of PCDs in idle modes.

SUMMARY OF THE DISCLOSURE

Various embodiments of methods and systems for hardware ("HW") and/or software ("SW") based dynamic memory management in a portable computing device ("PCD") are disclosed. One exemplary method includes generating a memory page lookup table ("LUT") in a memory component, such as a nonvolatile flash memory component. The LUT may include a record for each memory page located across multiple portions of a volatile memory, such as a DRAM. The DRAM may be divided into portions, such as an upper bank and a lower bank, as is understood in the art.

The records in the LUT are updated while the PCD is in an active state to keep track of those memory pages that are accessed by the PCD, thus indicating that data content is stored in the given memory pages. Similarly, by updating the LUT, those memory pages which do not contain data content are also tracked. When the PCD enters a sleep state to conserve energy, the LUT may be queried to determine which memory pages in a first portion of volatile memory (e.g., an upper bank) contain data content and which pages in a second portion of volatile memory (e.g., a lower bank) are available for receipt of content. Notably, depending on embodiment, pages identified to be available for receipt of content may be so identified because they do not presently contain any data or, alternatively, contain data which is "stale" and eligible to be overwritten.

Based on the query, the location of the data in the memory pages of the upper bank is known and can be migrated to memory pages in the lower bank which are identified for receipt of the data. Once migrated, the upper bank may be powered down, thus reducing the sleep current floor by avoiding the power consumption that would otherwise be required to self refresh the upper bank. Advantageously, because the LUT was leveraged to quickly know the specific memory pages in the upper bank which contained data and the specific memory pages in the lower bank which were eligible to receive the data, the time required to conduct the migration is kept at a minimum. As such, one of ordinary skill in the art would recognize that the amount of time the PCD must remain in the sleep state with the powered down upper bank in order to net a power savings is minimized.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 2A is an illustration of an exemplary memory page lookup table ("LUT"), shown before and after a page migration of an amount of content from an exemplary upper memory bank that was less than or equal to an amount of available space in an exemplary lower memory bank;

FIG. 3A is an illustration of an exemplary memory page lookup table ("LUT"), shown before and after a page migration of an amount of content from an exemplary upper memory bank that exceeded an amount of available space in an exemplary lower memory bank;

DETAILED DESCRIPTION

Figure 1:
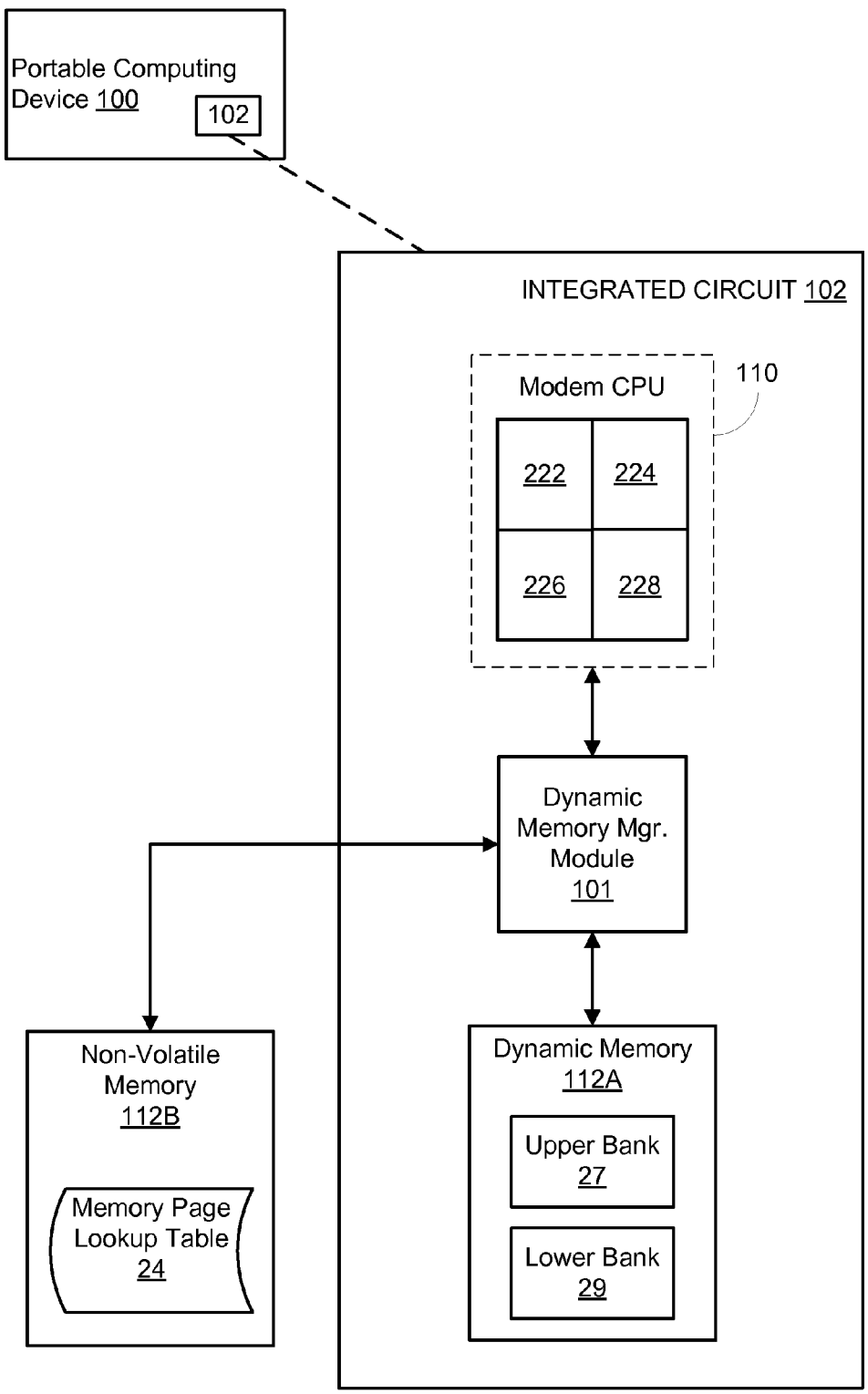
FIG. 1 is a functional block diagram illustrating an embodiment of an on-chip system for dynamic memory power management in a portable computing device ("PCD") through hardware ("HW") and/or software ("SW") based page migration.

The word "exemplary" is used herein to mean "serving as an example, instance, or illustration." Any aspect described herein as "exemplary" is not necessarily to be construed as exclusive, preferred or advantageous over other aspects.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In the context of this document, an "atom," "page" or "memory page" is a contiguous block of memory available for storage of content by the operating system for a given program. As an example, the contiguous block of memory may be a fixed-length contiguous block of memory, such as a row in a memory component (where a memory component is viewed as a matrix with a fixed number of rows and columns), although an atom, page or memory page is not limited to any specific size or length. Consequently, reference in this specification to a "page address" or "memory location" relates to the specific location within a given memory component at which a given "atom," "page" or "memory page" is located. As such, one of ordinary skill in the art will recognize in this description that a "page migration" refers to the transfer of data from a first page having a certain address in a memory component to second page having a different address. Notably, first and second page addresses may be located in separate memory components or the same memory component, depending on embodiment. Moreover, in the context of this description, a first page for storing an amount of content may have an address in a first bank or portion of a memory component while a second page for storing content may have an address in a second bank or portion of the same memory component, but not all embodiments are limited to such a configuration.

In this description, general reference to the term "memory," "memory component," "memory device," "computer-readable medium" or the like will be understood to envision both "volatile" and "non-volatile" types of memory components whether located "on-chip," "off-chip," "internal," "external" or otherwise relative to a PCD. Further, although generally depicted in this description as a single component, any of the various memory components may be a distributed memory device with separate data stores coupled to a digital signal processor (or additional processor cores). Also, for illustrative purposes, exemplary embodiments are provided in this description within the context of a single memory component divided into two portions—an "upper bank" portion and a "lower bank" portion. In this regard, one of ordinary skill in the art will recognize that reference to an upper bank and lower bank of a single memory device is convenient for illustrative purposes and in no way limits the application of the various embodiments and their equivalents to single memory devices divided into equal banks. As such, in this description, reference to a bank, whether "upper" or "lower," will be understood to envision any memory space that 1) may, or may not, be contiguous, 2) may, or may not, span multiple memory devices, 3) may, or may not, span multiple types of memory device, and 4) may, or may not, be symmetrical or otherwise equivalent to another bank.

Although it is envisioned that certain aspects of certain embodiments may be associated with either a volatile or a non-volatile component, the scope of this description will not be limited to such an extent that particular aspects of embodiments are uniquely associated with a certain memory type. That is, depending on the particular embodiment, a given aspect may be stored on, migrated to, or otherwise associated with any type of memory component. A memory component in this description may be, but is not limited to being, a flash memory type such as a MultiMediaCard ("MMC" or "eMMC") or Secure Digital ("SD") card, a semiconductor type such as a static random-access memory ("SRAM") that must be constantly powered or a dynamic random access memory ("DRAM") that must be periodically refreshed, a solid-state memory, an electrical connection having one or more wires, a portable computer diskette (magnetic), an electronic read-only memory ("ROM"), an erasable programmable read-only memory ("EPROM" or "EEPROM"), an optical fiber, a portable compact disc read-only memory ("CDROM"), etc.

In this description, one or more of the aspects of certain embodiments are implemented in hardware. In such embodiments, it is envisioned that the various logic of those aspects may be implemented with any or a combination of the following technologies, which are each well known in the art: a discrete logic circuit(s) having logic gates for implementing logic functions upon data signals, an application specific integrated circuit ("ASIC") having appropriate combinational logic gates, a programmable gate array(s) ("PGA"), a field programmable gate array ("FPGA"), etc.

As used in this description, the terms "component," "database," "module," "system" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "modem CPU," "digital signal processor ("DSP")," "chip" and "chipset" are non-limiting examples of processing components that may reside in a PCD and are used interchangeably except when otherwise indicated. Moreover, as distinguished in this description, a CPU, DSP, or a chip or chipset may be comprised of one or more distinct processing components generally referred to herein as "core(s)" and "sub-core(s)." Further to that which is defined above, a "processing component" may be, but is not limited to, a central processing unit, a graphical processing unit, a core, a main core, a sub-core, a processing area, a hardware engine, etc. or any component that resides within, or external to, an integrated circuit within a portable computing device and may enter a sleep, idle or standby state.

In an exemplary PCD, a full 0.6 mA of a total 1.3 mA of sleep current is attributable to the self refresh cycle of a couple 512 MB volatile memory components. As described above, this power consumption for self refreshing of memory when the PCD is in a sleep mode is a significant drain on the battery that dictates frequent recharging of the battery. Consequently, any reduction in the current associated with memory self refresh operations effectively increases the battery life, thereby also improving QoS. In an exemplary "high performance" PCD, the total sleep current may be on the order of 2.5 mA of which a significant 1.5 mA is attributable to memory self refresh operations. Clearly, reduction in the current required to maintain essential data integrity across memory components represents an opportunity to stretch battery life and improve QoS.

For illustrative purposes, assume a 512 MB memory component is divided into upper and lower memory banks (256 MB each). The power consumption associated with self refreshing the entire memory component can be cut in half by powering down one of the two memory banks when the PCD is in idle mode (by powering down the upper bank, for example). In this way, essential data contents can be maintained in the lower memory bank that remains powered while power savings can be realized from taking the upper memory bank offline. The problem with such a simple power savings method, however, is that essential data contents are distributed randomly across both the upper and lower banks and, as such, simply powering down the upper bank will cause data stored in that bank to be lost.

Furthering the above example, a method to retain the data contents of the upper bank before it is powered down includes migrating pages of content from the upper bank to unused and available memory space in the lower bank. Once that is done, the upper bank could be powered down without a loss of essential data content, thereby realizing a power savings in the PCD sleep current that would otherwise be consumed by the self refresh operation of the upper bank.

One method for page migration is a software ("SW") driven method that requires each page of the upper and lower banks to be individually checked to determine if content is stored there. As described above, data content may be randomly saved across both the upper and lower banks, with only some pages in each of the banks containing data. Consequently, the pages are checked in a "page by page" or "trial and error" fashion. If content is found at a page address of the upper bank, for instance, then the content may be migrated to a page address in the lower bank. Notably, this description and other descriptions in this specification that refer to migration of data content from an upper bank to a lower bank are exemplary in nature and are not meant to limit the scope of the embodiments to include only migrations from an "upper" bank to a "lower" bank. Essentially, migration from any memory location to any other memory location is envisioned. One of ordinary skill in the art will recognize that, absent any configuration to the contrary, data may be migrated from any location in a memory component to any other location in the same memory component or another memory component.

Returning to the exemplary SW driven page migration, migration of data content from an upper bank page address may present a choice of overwriting data stored in the receiving address of the lower bank (thus losing the data already in the lower bank address in favor of saving the data sought to be migrated from the upper bank address) or checking a next lower bank address in the hopes of finding available storage space.

The power consumption overhead associated with embodiments of the SW method can be excessive, with the time required to iterate through the page by page checking process being relatively long in duration. As a result, the power consumed during the page migration can outweigh the power ultimately saved by powering down the upper bank after the migration is complete. Stated another way, the power consumed due to the iteratively intense page by page SW migration determines a "return on investment" measured in the amount of power saved over a period of time during which the PCD remains in a sleep mode.

For illustrative purposes, the payback for leveraging an exemplary SW based page migration before powering down a portion of volatile memory can be calculated as follows. Assuming stable memory contents that need to be preserved are not larger than half the memory density, i.e. assuming a pager migration size of 256 MB in a 512 MB memory component, the penalty could be estimated as 2 (for two 256 MB memory banks)×10 seconds (time it takes to complete the iterative SW page migration)×250 mA (amount of current drawn per second)×3.7V=5.14 mWH of power consumed. As a result of the exemplary migration, a reduction of 0.3 mA may be realized in the sleep floor due to the powering down of the upper bank after the migration. At 0.3 mA of power savings, it would take 4.6 hours of idle time in the PCD to recoup the energy consumed to maintain the integrity of memory contents prior to powering down the 256 MB upper bank [(5.14 mWH/3.7V)/0.3 mA=4.6 hours]. Notably, this exemplary calculation does not even take into consideration the additional power penalty associated with "waking up" the PCD in order to conduct the SW based migration, which could effectively increase the 4.6 hours to upwards of 9.2 hours of idle time required to justify the overhead cost of the SW based migration.

A hardware ("HW") based dynamic memory management ("DMM") system and method can lower the overhead cost of conducting the page migration relative to the overhead cost associated with a typical SW based solution such as the one outlined above. By using a lookup table ("LUT") stored in a non-volatile memory source (or, in some embodiments, stored in a dedicated portion of a volatile memory source), the specific page addresses of stored content may be tracked and ultimately queried for use in a targeted page migration. Because embodiments can quickly identify the location of content in the upper bank, for instance, and the location of available storage space in the lower bank, for instance, the iterative methodology of the SW based approach outlined above can be avoided, thereby drastically reducing the amount of time (and, thus, power) required to conduct the page migration prior to powering down the upper bank.

One exemplary HW based DMM embodiment creates a LUT in a flash memory component. The LUT contains records individually associated with each page address in one or more memory components, such as a DRAM memory component. Referring back to the exemplary scenario above, the LUT may include a record for each page address in the upper and lower banks of the 512 MB DRAM memory component.

During normal operation of the PCD, the LUT may be updated with each access of a memory page by a process or application. When a given page is accessed, thus necessitating that data content is stored in the given page, the record in the LUT that is associated with the accessed page address may be marked in binary with a "0", thereby documenting in the LUT that the given address contains content. Similarly, if a record is marked with a "1", then the associated page is assumed to be empty or, at least, available for overwriting, as the case may be. Notably, the use of a binary "0" in this specification to indicate in the LUT that a page contains data, and similarly a "1" to indicate that a page is available to receive data, is for illustrative purposes only and will not limit the embodiments to just such a configuration. That is, one of ordinary skill in the art will recognize that the binary indications may be leveraged in a reverse manner to that which is described. Other ways of documenting records in the LUT will occur to those with ordinary skill in the art.

Returning to the exemplary HW based DDM embodiment, assume a volatile memory component comprising 512 MB of memory space (divided into upper and lower banks of 256 MB). Further, assume that each memory page of the 512 MB represents 4 KB of capacity (i.e., 0.004 MB). For a PCD having 2 GB of eMMC or flash memory, for example, the resulting LUT leveraged by the HW based DMM embodiment would consist of 500,000 records (2000 MB/0.004 MB=500,000 memory pages). Advantageously, only about 64 KB of nonvolatile flash memory would be required to maintain the LUT—a minute amount of memory that requires a negligible amount of power to update. Notably, although the exemplary embodiments described herein include location of the LUT in a flash memory, it is envisioned that the LUT may be located in any memory component associated with the PCD. It is envisioned, for example, that some embodiments may located the LUT in a dedicated memory space in the DRAM such as in a portion of the lower bank in the above illustration (since in the illustration the lower bank is the portion of the memory component that is earmarked to be preserved and self refreshed).

It is further envisioned that in some embodiments the LUT may be updated each time a page is accessed while in other embodiments the LUT could be updated periodically in a batch manner. In still other embodiments, the updates may be timed to occur in between memory transactions, especially if the embodiment includes location of the LUT in a volatile memory space. For example, as mentioned above, in some embodiments the LUT could be maintained in a small, dedicated amount of space allocated from the lower bank or upper bank of a given DRAM memory component (i.e., in whichever bank is designated for preservation).

Further, it is also envisioned that some embodiments of the HW based DMM solution may consider the duration of time that has elapsed since a given page was accessed. Based on that amount of time, the data contained in a given page may be assumed to be stale, thereby triggering the LUT to be updated accordingly. For example, the LUT may contain an additional designation for each record that earmarks the particular memory page as eligible for overwriting or, alternatively, in other embodiments the binary indicator of content may be changed from a "0" to a "1" (extending the example above) to flag the given memory page as space available for receipt of new content in a page migration.

Notably, for ease of illustration, the examples offered in the present specification are provided in the context of a 512 MB DRAM memory component divided into upper and lower banks of 256 MB each where page migration from the upper bank to the lower bank is desirable so that the upper bank may be powered down while the PCD is in standby mode. As stated above, the scope of this disclosure is not limited to just such a configuration. Moreover, it is envisioned that in some embodiments a smaller portion of a memory bank, such as the exemplary upper memory bank, may be migrated prior to powering down just that portion. By way of example and not limitation, the LUT may be leveraged to track the pages in 128 MB of the 256 MB upper bank so that after a migration only the 128 MB is powered down.

Returning to the exemplary HW based DMM embodiments that include a LUT configured to document the relative "staleness" of content stored in the memory pages, i.e. the duration of time since the last access of the content stored in a certain memory page, such embodiments are envisioned to be useful when the number of pages to be migrated exceed the number of pages known to be available for receipt of content. As described above, pages in the portion of memory designated for continual self refresh that contain data content that has not been accessed for a certain duration of time may be flagged in the LUT as eligible for overwriting. Other ways envisioned to flag memory pages in the LUT as eligible for overwriting include, but are not limited to, recognizing content used by certain applications as having a higher priority for maintaining than content used by other less important applications (such as an email application versus a gaming application), allowing the user to prioritize applications thus prioritizing the importance of data content associated with the applications, and designating content stored in certain portions of the memory component as being more important than content stored in other portions when the portions are dedicated to certain functionalities (i.e., application heap portion, video RAM portion, kernel portion, etc. where the application heap might be earmarked as first in line for overwriting).

It is further envisioned that still other embodiments may comprise a hybrid solution of a HW based DMM embodiment combined with a SW based DMM embodiment. For instance, in a scenario where all available space for receipt of content has been utilized, and all pages marked in the LUT as eligible for overwriting have been overwritten, and there is still essential content to be migrated, a hybrid solution may proceed to leverage a SW based solution that selects additional memory pages for overwriting or elects not to migrate certain pages. That is, the embodiment may bring up the SW based solution to do any process killing to complete the page migration after the HW based solution has completed its work. Notably, because the HW based approach will have already migrated some pages, the application of the SW based migration will inevitably take less time (though may still be significant), and thus the hybrid embodiment consuming less power, than just a pure SW based DMM approach alone. It is envisioned that a HW/SW hybrid DMM approach may be advantageous for high functionality PCDs with users who run many apps and tasks that place a heavy burden on overall memory capacity.

FIG. 1 is a functional block diagram illustrating an embodiment of an on-chip system for dynamic memory power management in a portable computing device ("PCD") through hardware ("HW") and/or software ("SW") based page migration. As can be seen in the diagram, a Dynamic Memory Management ("DMM") module 101 is in communication with a central processing unit ("CPU") 110 of an integrated circuit 102. The DMM module 101 may include a memory controller functionality for managing the storage and retrieval of data content for the benefit of the processors 222, 224, 226, 228 when the PCD 100 is in use. As would be understood by one of ordinary skill in the art, the DMM module 101 may store and retrieve content for applications run by CPU 110 in the dynamic memory 112A. The content may be randomly saved across the dynamic memory 112A in memory pages residing in either upper bank 27 or lower bank 29, as the case may be.

The DMM module 101 is also in communication with a nonvolatile memory component 112B which may be an eMMC memory device (i.e., a flash memory) that stores a memory page lookup table ("LUT") 24. As described above, when the PCD 100 enters a sleep state in an effort to minimize power consumption, the sleep mode of the CPU 110 may be recognized by the DMM module 101, thereby triggering the DMM module 101 to implement a page migration in the dynamic memory 112A. Advantageously, by migrating data contents from one memory bank to another, such as from upper bank 27 to lower bank 29, the bank from which the content was migrated (e.g., upper bank 27) may be powered down thereby reducing the portion of sleep current that would otherwise be consumed due to periodic self refreshing of the memory bank. The content migrated to the receiving memory bank (e.g., lower bank 29) as well as content already stored in the receiving bank may be maintained by self refresh operations while the PCD 100 remains in the sleep state.

In a certain embodiment, as the PCD 100 is in an active state, the DMM module 101 updates LUT 24 to document the page addresses at which content is stored in the dynamic memory 112A. The updates may be based on the recognition by the DMM module 101 that an application processed by the CPU 110 requested access to a given memory page in dynamic memory 112A. Moreover, in some embodiments, the updates may be based on the expiration of a certain amount of time since a given memory page was accessed, the particular application with which content stored in a given memory page is associated, etc.

As mentioned above, in certain embodiments the DMM module 101 may update the LUT 24 as it recognizes individual requests for access to data stored in given memory pages of dynamic memory 112A. In other embodiments, however, the DMM module 101 may update the LUT 24 in batches, thereby possibly furthering lowering the amount of power consumption required to update the LUT 24. Notably, as one of ordinary skill in the art would recognize, the DMM module 101 may be configured and operable to read and write to both the volatile dynamic memory 112A and the nonvolatile flash memory 112B.

As mentioned above, when the CPU 110 enters a sleep mode, the DMM module 101 may be triggered to implement a HW based page migration solution according to an exemplary embodiment. In doing so, the DMM module 101 of the exemplary embodiment queries the LUT 24 to identify the memory pages in upper bank 27 which contain data content recently accessed during the active period of the PCD 100. Based on the query, the DMM module 101 may target those identified memory pages in the upper bank 27 and migrate those pages to the lower bank 29. The memory pages in the lower bank 29 which are available for receipt of data, or eligible for overwriting, may also be identified by the DMM module 101 querying LUT 24.

Advantageously, by using the LUT 24, the DMM module 101 may carry out and complete a page migration in a minimal amount of time, thereby reducing the amount of power consumed during the migration and minimizing the amount of time in which the PCD 100 must remain in a sleep state to realize a power savings once upper bank 27 is powered down.

FIG. 2A is an illustration of an exemplary memory page lookup table ("LUT") 24A, shown before and after a page migration of an amount of content from an exemplary upper memory bank that was less than or equal to an amount of available space in an exemplary lower memory bank, such as upper bank 27 and lower bank 29 of the FIG. 1 illustration. In the BEFORE version of the LUT 24A, an individual record (i.e., row) is included for each memory page U-1 through U-n of upper bank 27 and L-1 through L-n of lower bank 29. A review of the records indicates that each memory page is designated with either a "0" or a "1," wherein the "0" indicates that content was accessed during the last active cycle of PCD 100 and a "1" indicates that the memory page is unused. Additionally, with respect to lower bank 29 records L-1 through L-n, a designation is further included to indicate whether the associated memory page is eligible for overwriting. In the BEFORE version of LUT 24A, the memory page in lower bank 29 represented by record L-2 is designated as eligible for overwriting. Notably, as one of ordinary skill in the art would recognize, such designation may also be accomplished via a binary methodology. Moreover, as described above, the overwrite eligibility presumes that content is presently stored in the memory page represented by the record but the content is eligible to be overwritten in the event that fresher content migrating from upper bank 27 needs a place for storage.

Turning to the AFTER version of LUT 24A, the results of a page migration using a HW based dynamic memory management solution can be seen. Notably, the number of pages represented in the exemplary BEFORE version of the LUT 24A that required migration from upper bank 27 to lower bank 29 is two (U-1 and U-2). Advantageously, because a query of the LUT 24A can determine that no content is stored in the memory pages represented by records U-3, U-4 and U-n, the exemplary HW based DMM solution avoids checking those locations. The number of pages represented in the exemplary BEFORE version of the LUT 24A that are available in lower bank 29 for the receipt of content is three (L-3, L-4 and L-n).

Referring to the AFTER version of LUT 24A, it can be seen that content was migrated from upper bank 27 to lower bank 29 such that each of the records associated with memory pages U-1 through U-n are designated with a "1," thus indicating that upper bank 27 may be powered down without loss of data. Likewise, the content formerly stored at the memory pages represented by U-1 and U-2 has been migrated to formerly unoccupied memory pages L-3 and L-4. Notably, because the number of pages needing migration was less than or equal to the available pages in the lower bank 29, the memory page represented by record L-2 did not need to be overwritten in order to complete the migration.

Figure 2B:
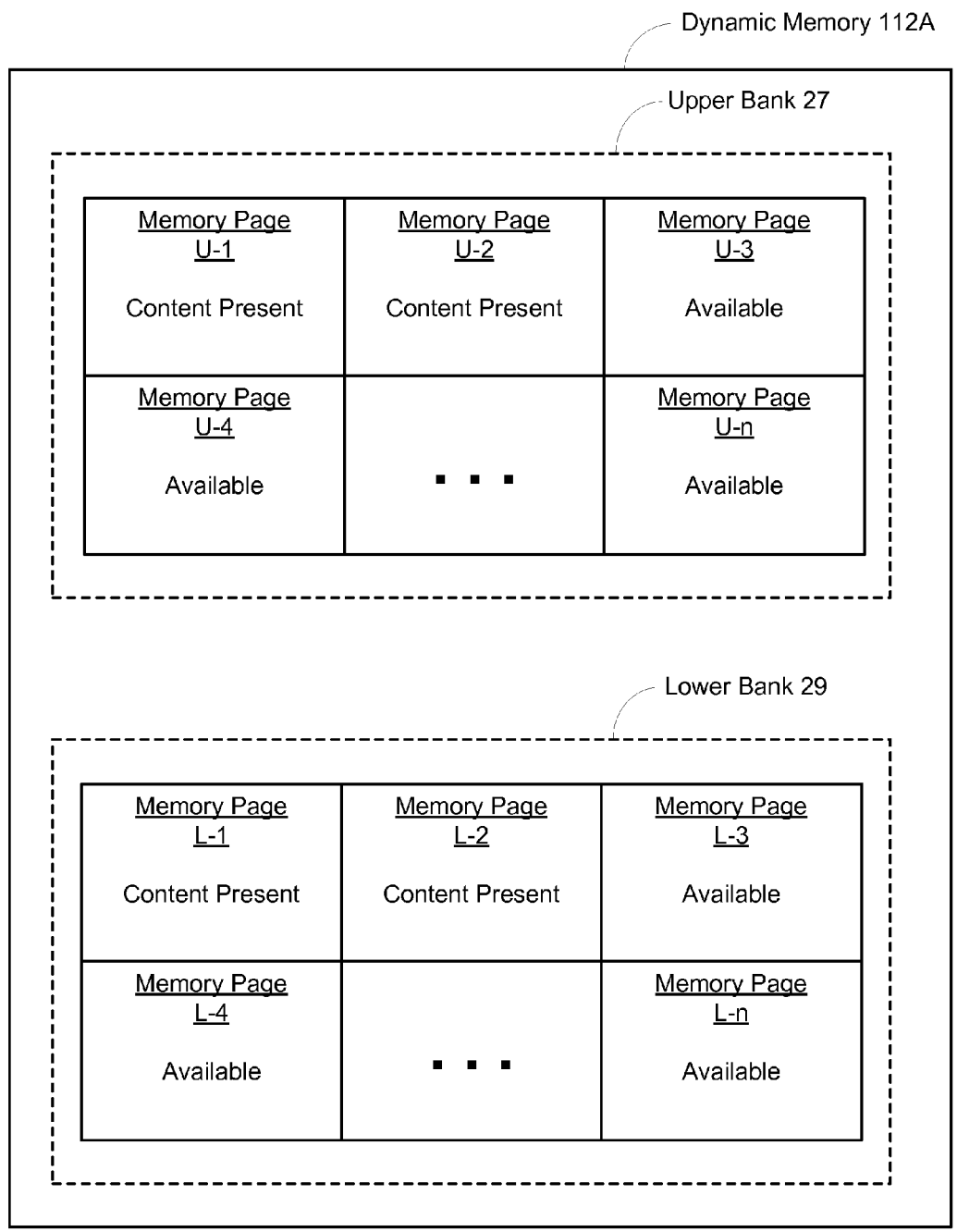
FIG. 2B is an illustration of an exemplary upper bank and lower bank in a memory component correlating to the "before" table of FIG. 2A.

FIG. 2B is an illustration of an exemplary upper bank 27 and lower bank 29 in a memory component 112A correlating to the BEFORE version of the LUT 24A of FIG. 2A. A review of the FIG. 2B illustration depicts the state of the memory 112A prior to the migration described relative to FIG. 2A. Mapping the records in the BEFORE version of the LUT 24A, content is stored at memory pages U-1 and U-2 of upper bank 27 and memory pages L-1 and L-2 of lower bank 29.

Figure 2C:
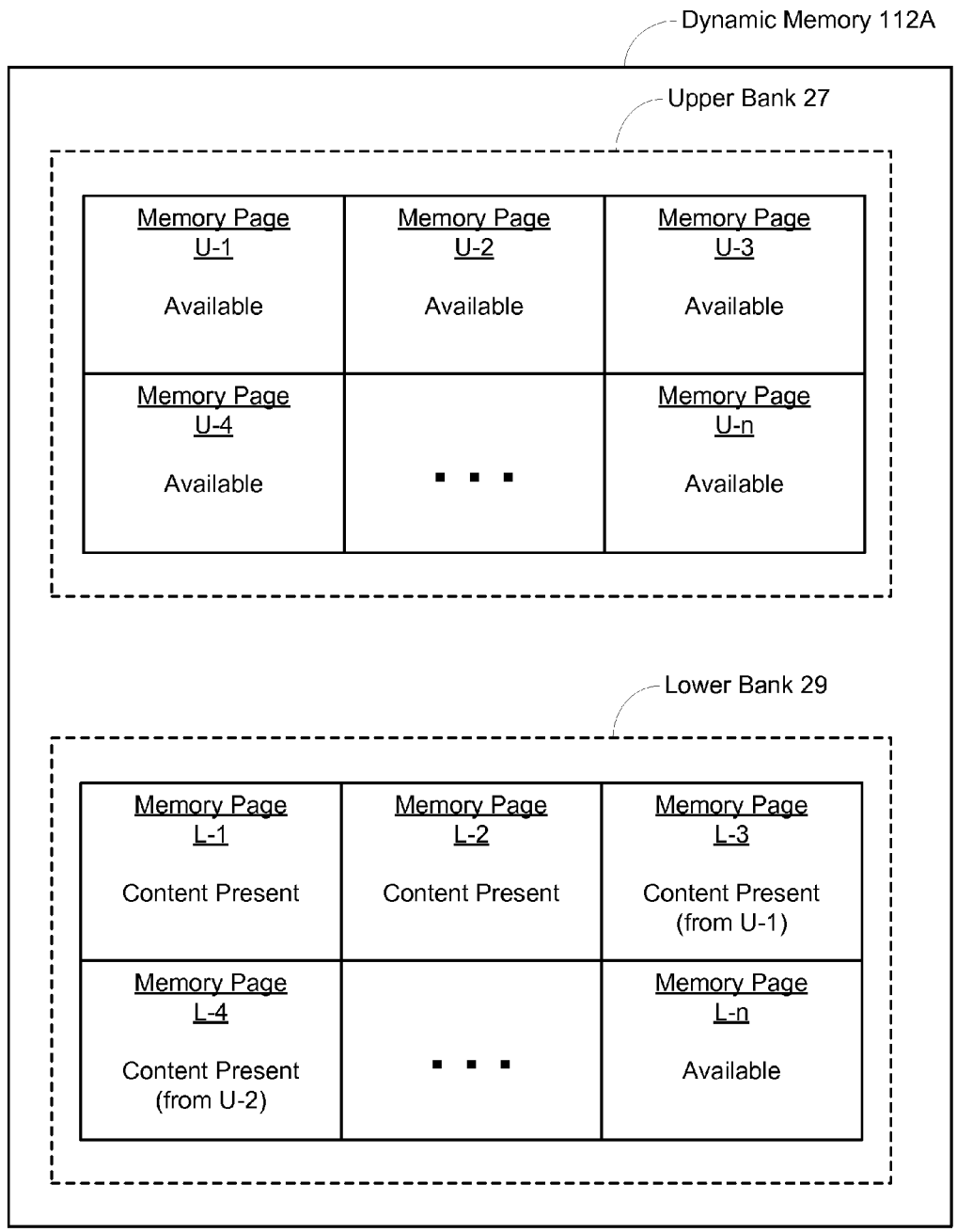
FIG. 2C is an illustration of an exemplary upper bank and lower bank in a memory component correlating to the "after" table of FIG. 2A.

Referring to FIG. 2C, the exemplary upper bank 27 and lower bank 29 in memory component 112A correlating to the AFTER version of the LUT 24A of FIG. 2A is depicted. A review of the FIG. 2C illustration depicts the state of the memory 112A after the migration described relative to FIG. 2A. Mapping the records in the AFTER version of the LUT 24A, content formerly stored at the memory pages represented by records U-1 and U-2 have been migrated to the formerly available memory pages associated with records L-3 and L-4. Consequently, the memory pages of the upper bank 27 are conditioned for powering down while the content formerly spread across both banks 27, 29 is now stored in the memory pages of just lower bank 29. As such, upper bank 27 may be powered down to reduce the sleep floor current consumed while PCD 100 is in a standby state. Lower bank 29 may be continually powered and refreshed to maintain the integrity of all the data stored there.

FIG. 3A is an illustration of an exemplary memory page lookup table ("LUT") 24B, shown before and after a page migration of an amount of content from an exemplary upper memory bank that was greater than an amount of available space in an exemplary lower memory bank, such as upper bank 27 and lower bank 29 of the FIG. 1 illustration. In the BEFORE version of the LUT 24B, an individual record (i.e., row) is included for each memory page U-1 through U-n of upper bank 27 and L-1 through L-n of lower bank 29. A review of the records indicates that each memory page is designated with either a "0" or a "1," wherein the "0" indicates that content was accessed during the last active cycle of PCD 100 and a "1" indicates that the memory page is unused. Additionally, with respect to lower bank 29 records L-1 through L-n, a designation is further included to indicate whether the associated memory page is eligible for overwriting. In the BEFORE version of LUT 24B, the memory page in lower bank 29 represented by record L-2 is designated as eligible for overwriting. Notably, as one of ordinary skill in the art would recognize, such designation may also be accomplished via a binary methodology. Moreover, as described above, the overwrite eligibility presumes that content is presently stored in the memory page represented by the record L-2 but the content is eligible to be overwritten in the event that fresher content migrating from upper bank 27 needs a place for storage.

Turning to the AFTER version of LUT 24B, the results of a page migration using a HW based dynamic memory management solution can be seen. Notably, the number of pages represented in the exemplary BEFORE version of the LUT 24B that required migration from upper bank 27 to lower bank 29 is two (U-1 and U-2). Advantageously, because a query of the LUT 24B can determine that no content is stored in the memory pages represented by records U-3, U-4 and U-n, the exemplary HW based DMM solution avoids checking those locations. The number of pages represented in the exemplary BEFORE version of the LUT 24B that are available in lower bank 29 for the receipt of content is only 1 (L-3), notwithstanding that the memory page represented by record L-2 is eligible for overwriting.

Referring to the AFTER version of LUT 24B, it can be seen that content was migrated from upper bank 27 to lower bank 29 such that each of the records associated with memory pages U-1 through U-n are designated with a "1," thus indicating that upper bank 27 may be powered down without loss of data. Likewise, the content formerly stored at the memory pages represented by U-1 and U-2 has been migrated to formerly unoccupied memory page L-3 and overwritten to memory page L-2. Notably, because the number of pages needing migration was more than the available pages in the lower bank 29, the memory page represented by record L-2 was overwritten in order to complete the migration. Because the data formerly stored in L-2 was "stale" due to not being accessed recently or, perhaps, was associated with an application of low priority, the HW based DMM solution elected to overwrite L-2 in favor of maintaining the integrity of the data migrated from either U-1 or U-2.

Figure 3B:
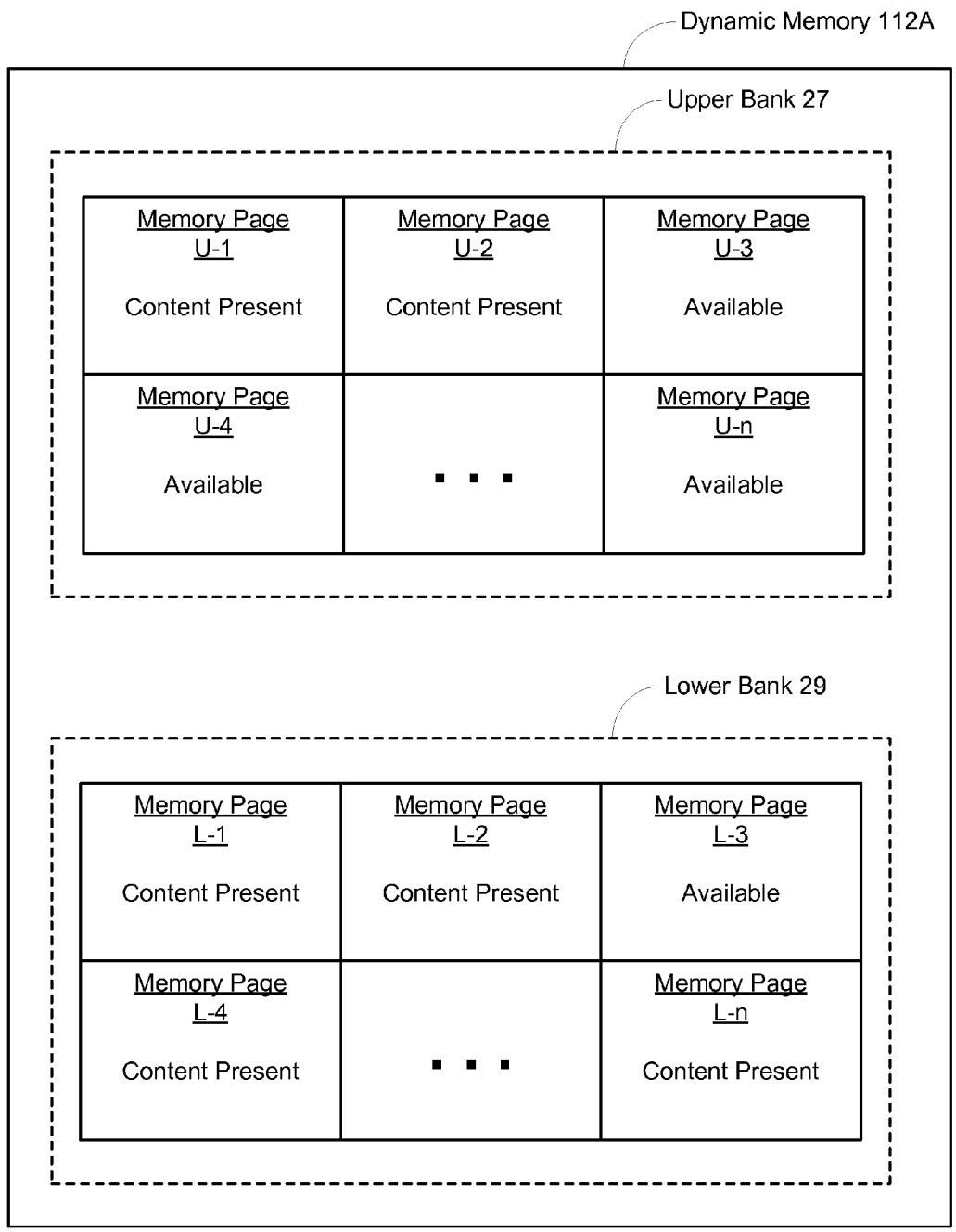
FIG. 3B is an illustration of an exemplary upper bank and lower bank in a memory component correlating to the "before" table of FIG. 3A.

FIG. 3B is an illustration of an exemplary upper bank 27 and lower bank 29 in a memory component 112A correlating to the BEFORE version of the LUT 24B of FIG. 3A. A review of the FIG. 3B illustration depicts the state of the memory 112A prior to the migration described relative to FIG. 3A. Mapping the records in the BEFORE version of the LUT 24B, content is stored at memory pages U-1 and U-2 of upper bank 27 and memory pages L-1, L-2, L-4 and L-n of lower bank 29.

Figure 3C:
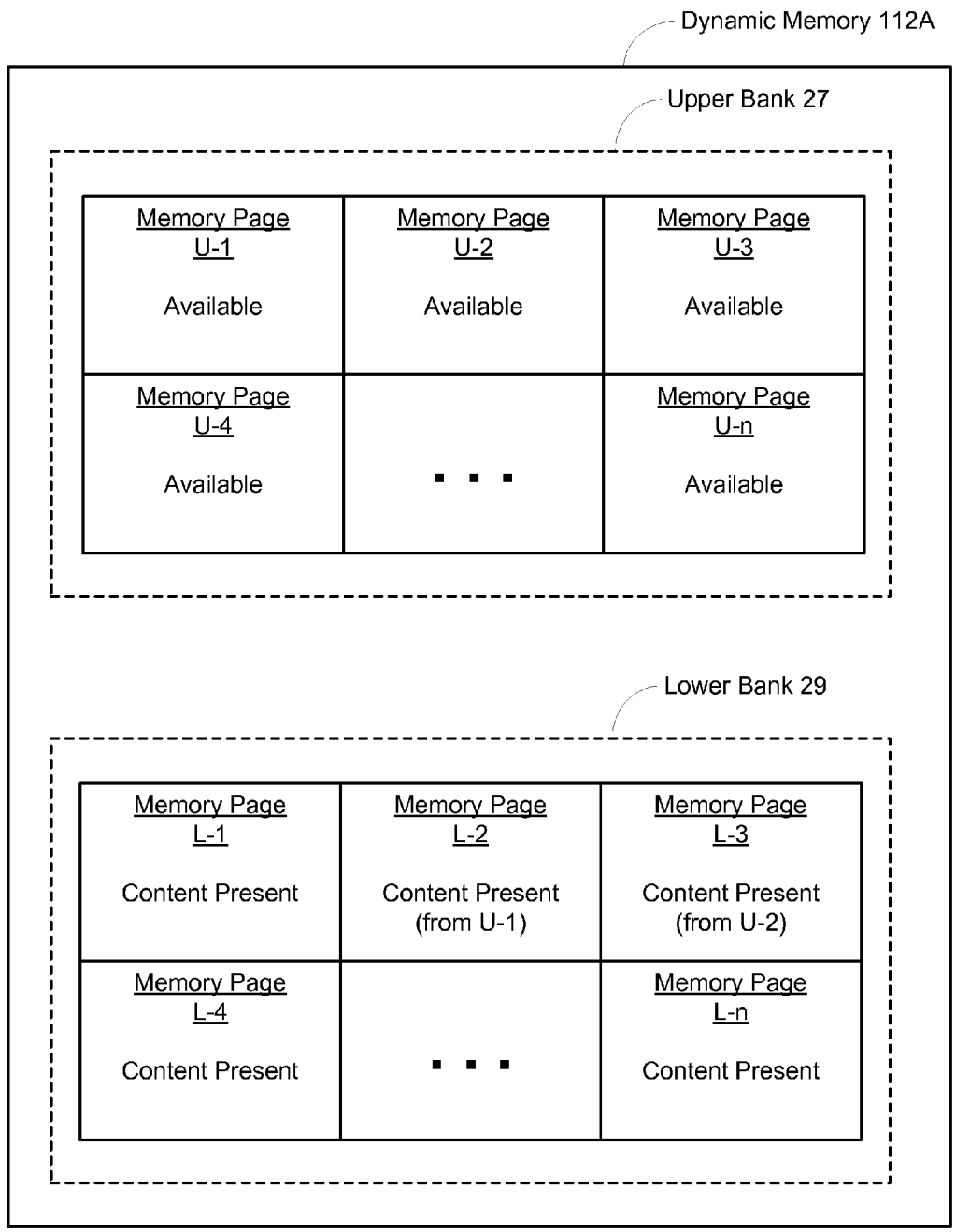
FIG. 3C is an illustration of an exemplary upper bank and lower bank in a memory component correlating to the "after" table of FIG. 3A.

Referring to FIG. 3C, the exemplary upper bank 27 and lower bank 29 in memory component 112A correlating to the AFTER version of the LUT 24B of FIG. 3A is depicted. A review of the FIG. 3C illustration depicts the state of the memory 112A after the migration described relative to FIG. 3A. Mapping the records in the AFTER version of the LUT 24B, content formerly stored at the memory pages represented by records U-1 and U-2 have been migrated to the formerly available memory page L-3 and page L-2 which was eligible for overwriting. Consequently, the memory pages of the upper bank 27 are conditioned for powering down while the content formerly spread across both banks 27, 29 is now stored in the memory pages of just lower bank 29. As such, upper bank 27 may be powered down to reduce the sleep floor current consumed while PCD 100 is in a standby state. Lower bank 29 may be continually powered and refreshed to maintain the integrity of all the data stored there.

Figure 4:
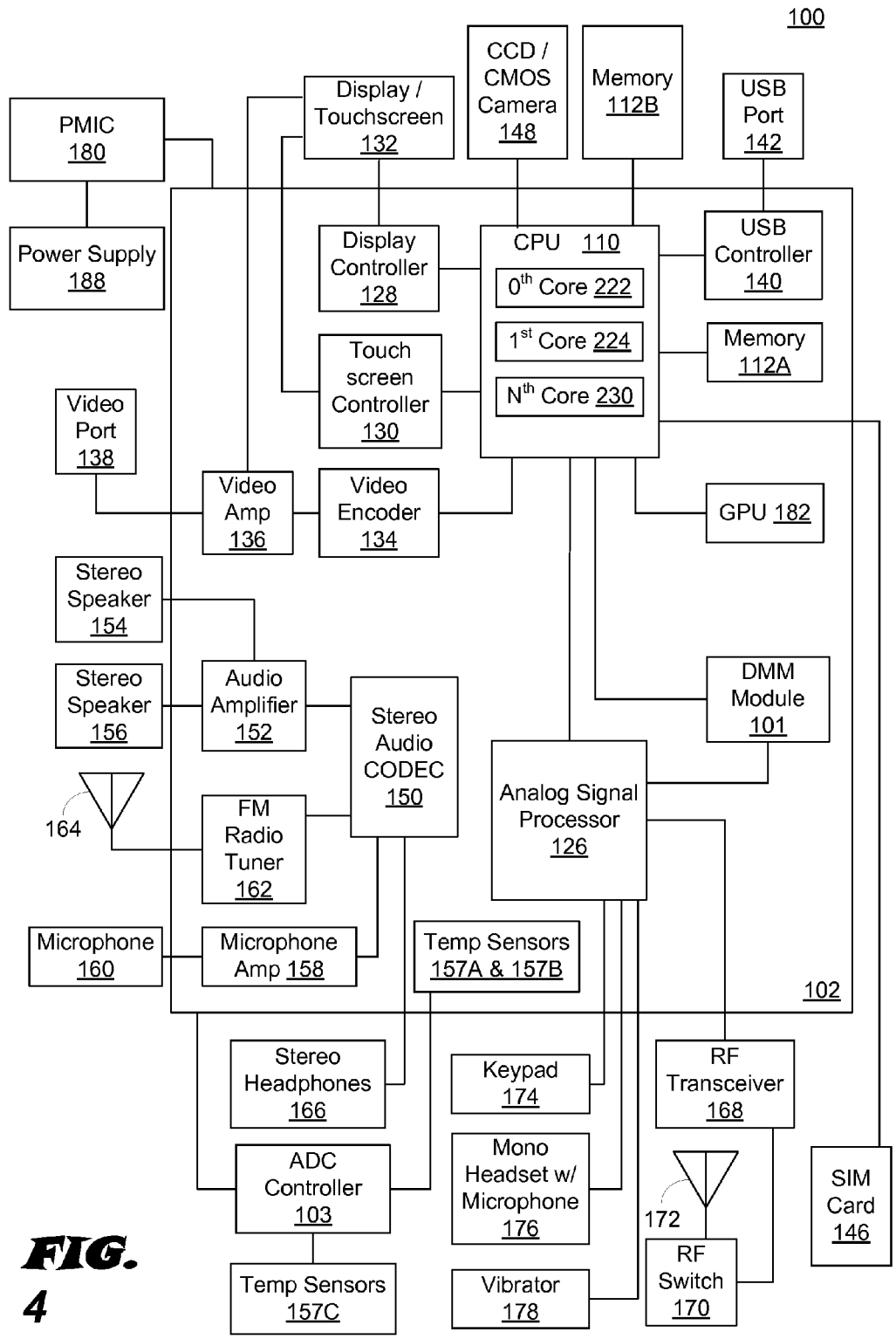
FIG. 4 is a functional block diagram of an exemplary, non-limiting aspect of a PCD in the form of a wireless telephone for implementing methods and systems for dynamic memory power management through hardware ("HW") and/or software ("SW") based page migration.

FIG. 4 is a functional block diagram of an exemplary, non-limiting aspect of a PCD in the form of a wireless telephone for implementing methods and systems for dynamic memory power management through hardware ("HW") and/or software ("SW") based page migration.

As shown, the PCD 100 includes an on-chip system 102 that includes a central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process different workloads associated with differing applications or functionality of the PCD 100, thereby requiring access to different memory pages within a memory 112.

In general, the DMM module(s) 101 may be responsible for monitoring the CPU 110, controlling the storage and retrieval of data content when the PCD 100 is in an active state, documenting the number and timing of access events to stored data content, and apply HW based and/or SW based dynamic memory management solutions. Application of the DMM solutions may reduce the sleep floor current consumed while the PCD 100 is in an idle or standby state, advantageously extending battery life of the PCD 100. In this way, the DMM module(s) 101 may optimize QoS provided to the user by minimizing the frequency of charge cycles on the power supply 188.

The DMM module(s) 101 may comprise software which is executed by the CPU 110. However, the DMM module(s) 101 may also be formed from hardware and/or firmware without departing from the scope of the invention. The DMM module(s) 101 may be configured to and operational to read and write data content to any of memory components 112. For instance, in certain embodiments, a LUT 24 may reside in external flash memory, such as non-volatile memory 112B, and be continually managed and updated by DMM module(s) 101. Similarly, and briefly referring back to the FIG. 1 illustration, a LUT 24 may reside in a non-volatile memory 112B that is located on-chip. In still other embodiments, a LUT 24 may reside in on-chip DRAM memory, such as volatile memory 112A, and be continually managed and updated by DMM module(s) 101. As described above and below, the DMM module(s) 101 may query the LUT 24 to identify the location of content within memory 112 and the location of available space within memory 112 so that the content can be quickly and efficiently migrated to a portion of memory 112 designated to remain powered while the PCD 100 is in an idle state.

As illustrated in FIG. 4, a display controller 128 and a touch screen controller 130 are coupled to the CPU 110. A touch screen display 132 external to the on-chip system 102 is coupled to the display controller 128 and the touch screen controller 130.

PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the central processing unit ("CPU") 110. A video amplifier 136 is coupled to the video decoder 134 and the touch screen display 132. A video port 138 is coupled to the video amplifier 136. As depicted in FIG. 4, a universal serial bus ("USB") controller 140 is coupled to the CPU 110. Also, a USB port 142 is coupled to the USB controller 140. An on-chip memory component 112A may also be coupled to the CPU 110. An off-chip memory component 112B, such as but not limited to a flash memory, and a subscriber identity module (SIM) card 146 may be external to chip 102 and coupled to CPU 110. Further, as shown in FIG. 4, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 4, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 4 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 4 further indicates that a radio frequency ("RF") transceiver 168 may be coupled to the analog signal processor 126. An RF switch 170 may be coupled to the RF transceiver 168 and an RF antenna 172. As shown in FIG. 4, a keypad 174 may be coupled to the analog signal processor 126. Also, a mono headset with a microphone 176 may be coupled to the analog signal processor 126. Further, a vibrator device 178 may be coupled to the analog signal processor 126. FIG. 4 also shows that a power supply 188, for example a battery, is coupled to the on-chip system 102 via a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A and 157B as well as one or more external, off-chip thermal sensors 157C. The on-chip thermal sensors 157A, 157B may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157 may produce a voltage drop that is converted to digital signals with an analog-to-digital converter ("ADC") controller 103 (See FIG. 5A). However, other types of thermal sensors 157 may be employed without departing from the scope of the invention.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157C, memory 112B, PMIC 180 and the power supply 188 are external to the on-chip system 102.

In a particular aspect, one or more of the method steps described herein may be implemented by executable instructions and parameters stored in the memory 112 that form the one or more DMM module(s) 101. These instructions that form the DMM module(s) 101 may be executed by the CPU 110, the analog signal processor 126, the GPU 182, or another processor, in addition to the ADC controller 103 to perform the methods described herein. Further, the processors 110, 126, the memory 112, the instructions stored therein, or a combination thereof may serve as a means for performing one or more of the method steps described herein.

Figure 5:
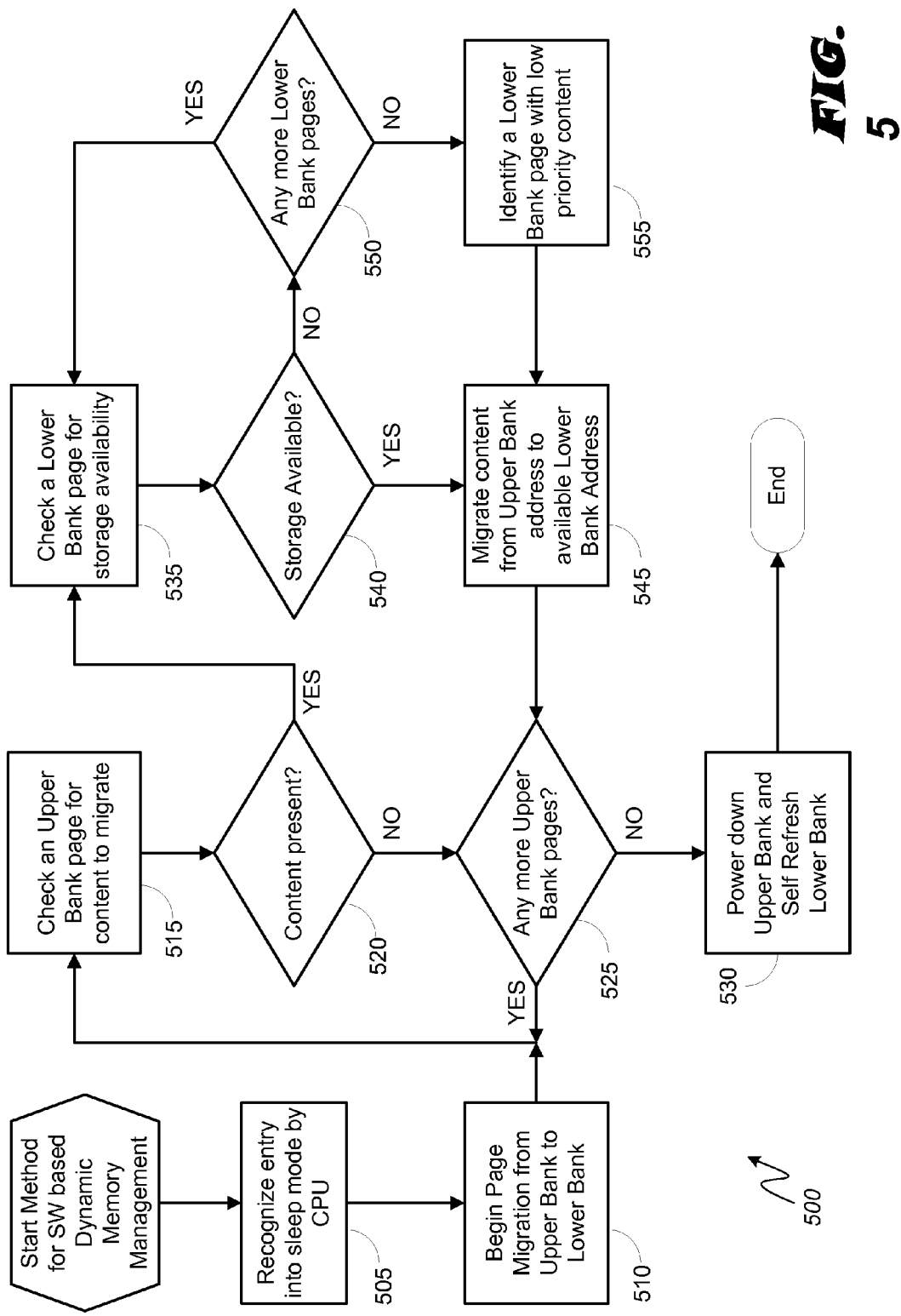
FIG. 5 is a logical flowchart illustrating an embodiment of a method for SW-based dynamic memory power management in the PCD of FIG. 4.

FIG. 5 is a logical flowchart illustrating an embodiment of a method 500 for SW-based dynamic memory power management in the PCD 100 of FIG. 4. Beginning at block 505, a DMM module 101 may recognize that CPU 110 has entered a sleep mode. Because a purpose of a sleep mode is to conserve energy, at block 510 the DMM module 101 may begin a page migration between memory components 112 of the PCD 100, such as memory banks 27 and 29 of memory component 112A, in preparation for powering down a portion of the memory components 112. As was described above, the power consumption associated with a sleep mode may be advantageously reduced by powering down volatile memory components 112A thereby avoiding the current associated with the periodic refresh operation. Moreover, as one of ordinary skill in the art would recognize, mitigating the amount of power consumed in order to migrate pages between memory components 112 reduces the amount of time that the PCD 100 has to stay in a sleep mode in order to realize a net power savings.

Returning to FIG. 5, at block 510 the DMM module 101 initiates a SW based dynamic memory management solution. At block 515, the DMM module 101 checks a first memory page in upper bank 27 to determine if content is stored there. If at decision block 520 it is determined that content is stored in the checked memory page of upper bank 27, then the method proceeds to block 535 and a memory page in the lower bank 29 is check for content. If at decision block 540 it is determined that the memory page checked in the lower bank 29 contains content, then the process moves to decision block 550 and a next memory page in lower bank 29 is checked at 535. The process repeats in this manner through blocks 535, 540 and 550 until a memory page in the lower bank 29 is discovered with available space. Once an available memory page is discovered at decision block 540, the process moves to block 545 and the content that was identified in the memory page of upper bank 27 is migrated to the available memory page in lower block 29.

The process moves to decision block 525 to determine if there is another memory page in the upper bank 27 to check for content. As long as there are memory pages in the upper bank 27 to check for content, the process will iterate, finding content in the memory pages of the upper bank 27 ("yes" branch of decision block 520) and migrating them to memory blocks identified in the lower bank 29 to have unused space ("yes" branch of decision block 540 and block 545). When checking memory pages in the lower bank 29 for unused space, if no unused memory pages are identified, some embodiments may identify a memory page in the lower bank that has low priority content stored therein (block 555) and then at block 545 migrate the content from the memory page of the upper bank 27 and overwrite the memory page of the lower bank 29 that has a low priority designation. Still other embodiments may simply overwrite content in a memory page of the lower bank 29 without regard for the importance of the content already stored in the given lower bank 29 memory page.

Once there are no more memory pages in the upper bank 27 to check for content, the "no" branch of decision block 525 is followed to block 530 and the upper bank 27 is powered down to save sleep current, as described above.

Figure 6:
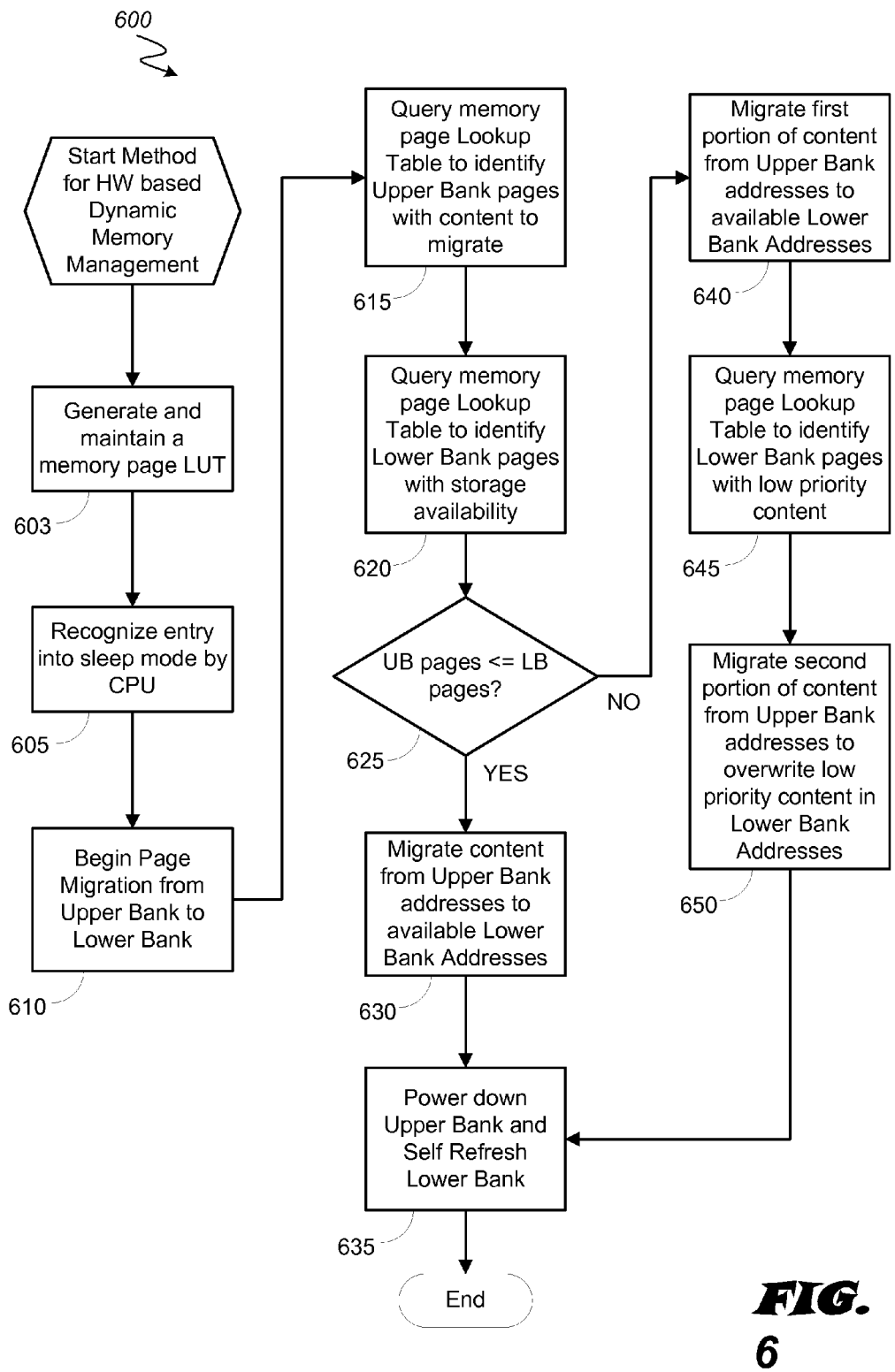
FIG. 6 is a logical flowchart illustrating an embodiment of a method for HW-based dynamic memory power management in the PCD of FIG. 4.

FIG. 6 is a logical flowchart illustrating an embodiment of a method 600 for HW-based dynamic memory power management in the PCD 100 of FIG. 4. Beginning at block 603, a memory page LUT, such as exemplary LUT 24, is generated and maintained. As described above, the LUT may include records associated with each memory page in a memory 112 that designate the status of each memory page including, but not limited to, designation of whether it presently contains data, eligibility to be overwritten, etc. The LUT is updated while the PCD is in an active state, as described above. At block 605, a DMM module 101 may recognize that CPU 110 has entered a sleep mode. Because a purpose of a sleep mode is to conserve energy, at block 610 the DMM module 101 may begin a page migration between memory components 112 of the PCD 100, such as memory banks 27 and 29 of memory component 112A, in preparation for powering down a portion of the memory components 112. As was described above, the power consumption associated with a sleep mode may be advantageously reduced by powering down volatile memory components 112A thereby avoiding the current associated with the periodic refresh operation. Moreover, as one of ordinary skill in the art would recognize, mitigating the amount of power consumed in order to migrate pages between memory components 112 reduces the amount of time that the PCD 100 has to stay in a sleep mode in order to realize a net power savings.

Returning to FIG. 6, at block 610 the DMM module 101 initiates a HW based dynamic memory management solution. At block 615, the DMM module 101 queries a memory page lookup table ("LUT"), such as LUT 24, which was managed and updated by the DMM module 101 while the PCD 100 was in an active state. Querying the LUT 24 at block 615, the DMM module 101 may advantageously identify all the specific memory pages within upper bank 27, for instance, that presently contain data content that needs to be migrated. Similarly, at block 620, the DMM module 101 may query the LUT 24 to determine those memory pages in the lower bank 29 which are presently unused and available for receipt of data content.

At decision block 625, the DMM module 101 may determine whether the number of pages in the upper bank 27 exceed the number of available memory pages in the lower bank 29. If the number of pages requiring migration from the upper bank 27 is less than or equal to the number of pages available to receive content in the lower bank 29, then the "yes" branch is followed to block 630. At block 630, the DMM module 101 causes the content in the identified upper bank 27 memory pages to be migrated to available pages in the lower bank 29. Subsequently, at block 635 the upper bank 27 may be powered down and the lower bank maintained and periodically refreshed to preserve the data stored therein. Advantageously, because the DMM module 101 didn't have to iteratively check each memory page in the upper and lower banks 27, 29 in order to find content for migration and find a place to which it may be migrated, the time required to complete the migration is minimize thus reducing the power consumption associated with the migration and reducing the amount of time in which the PCD 100 must remain in a standby state in order to net a power savings from powering down the upper bank 27.

Returning to decision block 625, if the number of pages in the upper bank 27 exceed the number of available pages in the lower bank 29, the "no" branch is followed to block 640. At block 640, a first portion of the content in the identified pages of upper bank 27 may be migrated to those pages which are available in lower bank 29. At block 645, a query of the LUT 24 may identify pages in the lower bank 29 which contain content but are eligible for overwriting. As described above, eligibility for overwriting may be determined by the duration of time since the last access to the content, the association of the content to a program or application that is considered low in priority, etc. A remaining second portion of content from pages in the upper bank 27 may be migrated at block 650 to those pages in the lower block 29 which have low priority content and are, thus, designated for overwriting if necessary. Notably, however, it is also envisioned that content from upper bank 27 that is older or deemed lower in priority than content in the lower bank 29 may be discarded or otherwise declined for migration to the lower bank 29, even though the content in the lower bank 29 is eligible to be overwritten.

From block 650, the process moves to block 635 and the upper bank 27 is powered down. It is envisioned that if there is still additional content to be migrated after block 650, some embodiments may simply power down the upper bank at 635 and sacrifice the portion of content that wasn't migrated. Other embodiments may transition to a SW based solution, such as the solution described above relative to the FIG. 5 method, and allow the SW based solution to iteratively decide what content in the lower bank 29 to overwrite.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently" etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a non-transitory computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for hardware ("HW") based dynamic memory management in a portable computing device ("PCD"), the method comprising:
   generating a memory page lookup table ("LUT") in a memory component, wherein the LUT includes a record for each of a plurality of memory pages located across multiple portions of a volatile memory;
   updating the LUT such that each record indicates whether data content is stored in the memory page associated with the record, wherein updating the LUT includes prioritizing importance of the data content associated with a plurality of applications based on the plurality of applications being prioritized by a user of the portable computing device;
   recognizing that the PCD has entered a sleep state;
   querying the LUT to determine which memory pages in a first portion of the volatile memory contain data content and which memory pages in a second portion of the volatile memory are available for receipt of content;
   if memory pages in the second portion of the volatile memory are not available, then querying the LUT to determine which memory pages in the second portion of the volatile memory contain data that is eligible to be overwritten, wherein data that is eligible to be overwritten is determined by the prioritization of the importance of the data content associated with the plurality of applications that have been prioritized by the user of the portable computing device and updated in the LUT;
   based on the querying of the LUT and if memory pages in the second portion of the volatile memory are available, migrating data content from memory pages in the first portion to memory pages available in the second portion;
   if memory pages in the second portion of the volatile memory are not available, then migrating data content from one or more memory pages in the first portion of the volatile memory to one or more memory pages in the second portion of the volatile memory which contain data that is eligible to be overwritten; and
   powering down the first portion of the volatile memory, wherein powering down the first portion of the volatile memory lowers a sleep current associated with the sleep state of the PCD.

2. The method of claim 1, wherein the data that is eligible to be overwritten is designated as such because it is associated with a low priority application.

3. The method of claim 1, wherein the data that is eligible to be overwritten is designated as such because it was not accessed during a previous amount of time.

4. The method of claim 1, wherein the LUT is stored in a nonvolatile memory component.

5. The method of claim 4, wherein the nonvolatile memory component is a flash memory component.

6. The method of claim 1, wherein the LUT is stored in a volatile memory component.

7. The method of claim 1, wherein the LUT is stored in the second portion of the volatile memory.

8. The method of claim 1, wherein the volatile memory is a dynamic random access memory ("DRAM").

9. The method of claim 1, wherein the first portion of the volatile memory and the second portion of the volatile memory are located in a same memory component.

10. A computer system for hardware ("HW") based dynamic memory management in a portable computing device ("PCD"), the system comprising:
   a dynamic memory management ("DMM") module operable to:
     generate a memory page lookup table ("LUT") in a memory component, wherein the LUT includes a record for each of a plurality of memory pages located across multiple portions of a volatile memory;
     update the LUT such that each record indicates whether data content is stored in the memory page associated with the record, wherein updating the LUT includes prioritizing importance of the data content associated with a plurality of applications based on the plurality of applications being prioritized by the user of the portable computing device;
     recognize that the PCD has entered a sleep state;
     query the LUT to determine which memory pages in a first portion of the volatile memory contain data content and which memory pages in a second portion of the volatile memory are available for receipt of content;
     determine if memory pages in the second portion of the volatile memory are not available, then query the LUT to determine which memory pages in the second portion of the volatile memory contain data that is eligible to be overwritten, wherein data that is eligible to be overwritten is determined by the prioritization of the importance of the data content associated with the plurality of applications that have been prioritized by the user of the portable computing device and updated in the LUT;
     based on the querying of the LUT and if memory pages in the second portion of the volatile memory are available, migrate data content from memory pages in the first portion to memory pages available in the second portion;
     determine if memory pages in the second portion of the volatile memory are not available, then migrate data content from one or more memory pages in the first portion of the volatile memory to one or more memory pages in the second portion of the volatile memory which contain data that is eligible to be overwritten; and power down the first portion of the volatile memory, wherein powering down the first portion of the volatile memory lowers a sleep current associated with the sleep state of the PCD.

11. The computer system of claim 10, wherein the data that is eligible to be overwritten is designated as such because it is associated with a low priority application.

12. The computer system of claim 10, wherein the data that is eligible to be overwritten is designated as such because it was not accessed during a previous amount of time.

13. The computer system of claim 10, wherein the LUT is stored in a nonvolatile memory component.

14. The computer system of claim 13, wherein the nonvolatile memory component is a flash memory component.

15. The computer system of claim 10, wherein the LUT is stored in a volatile memory component.

16. The computer system of claim 10, wherein the LUT is stored in the second portion of the volatile memory.

17. The computer system of claim 10, wherein the volatile memory is a dynamic random access memory ("DRAM").

18. The computer system of claim 10, wherein the first portion of the volatile memory and the second portion of the volatile memory are located in a same memory component.

19. A computer system for hardware ("HW") based dynamic memory management in a portable computing device ("PCD"), the system comprising:
  means for generating a memory page lookup table ("LUT") in a memory component, wherein the LUT includes a record for each of a plurality of memory pages located across multiple portions of a volatile memory;
  means for updating the LUT such that each record indicates whether data content is stored in the memory page associated with the record, wherein updating the LUT includes prioritizing importance of the data content associated with a plurality of applications based on the plurality of applications being prioritized by a user of the portable computing device;
  means for recognizing that the PCD has entered a sleep state;
  means for querying the LUT to determine which memory pages in a first portion of the volatile memory contain data content and which memory pages in a second portion of the volatile memory are available for receipt of content;
  means for querying the LUT to determine which memory pages in the second portion of the volatile memory contain data that is eligible to be overwritten if memory pages in the second portion of the volatile memory are not available, wherein data that is eligible to be overwritten is determined by the prioritization of the importance of the data content associated with the plurality of applications that have been prioritized by the user of the portable computing device and updated in the LUT;
  based on the querying of the LUT and if memory pages in the second portion of the volatile memory are available, means for migrating data content from memory pages in the first portion to memory pages in the second portion;
  means for migrating data content from one or more memory pages in the first portion of the volatile memory to one or more memory pages in the second portion of the volatile memory which contain data that is eligible to be overwritten if memory pages in the second portion of the volatile memory are not available; and
  means for powering down the first portion of the volatile memory, wherein powering down the first portion of the volatile memory lowers a sleep current associated with the sleep state of the PCD.

20. The computer system of claim 19, wherein the data that is eligible to be overwritten is designated as such because it is associated with a low priority application.

21. The computer system of claim 19, wherein the data that is eligible to be overwritten is designated as such because it was not accessed during a previous amount of time.

22. The computer system of claim 19, wherein the LUT is stored in a nonvolatile memory component.

23. The computer system of claim 22, wherein the nonvolatile memory component is a flash memory component.

24. The computer system of claim 19, wherein the LUT is stored in a volatile memory component.

25. The computer system of claim 19, wherein the LUT is stored in the second portion of the volatile memory.

26. The computer system of claim 19, wherein the volatile memory is a dynamic random access memory ("DRAM").

27. The computer system of claim 19, wherein the first portion of the volatile memory and the second portion of the volatile memory are located in a same memory component.

* * * * *